(12) United States Patent
Costello et al.

(10) Patent No.: US 8,793,156 B2
(45) Date of Patent: *Jul. 29, 2014

(54) METHOD AND SYSTEM FOR PROVIDING REWARD STATUS

(71) Applicant: Visa U.S.A. Inc., San Francisco, CA (US)

(72) Inventors: Tana Costello, Danville, CA (US); Loc Duc Nguyen, Miami, FL (US)

(73) Assignee: Visa U.S.A. Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/021,996

(22) Filed: Sep. 9, 2013

(65) Prior Publication Data
US 2014/0067507 A1    Mar. 6, 2014

Related U.S. Application Data

(63) Continuation of application No. 10/651,908, filed on Aug. 29, 2003, now Pat. No. 8,554,610.

(51) Int. Cl.
G06Q 30/00         (2012.01)
G06Q 90/00         (2006.01)

(52) U.S. Cl.
CPC .................................. *G06Q 90/00* (2013.01)
USPC ........................................................ 705/14.1

(58) Field of Classification Search
CPC ..................................................... G06Q 90/00
USPC ........................................................ 705/14.1
See application file for complete search history.

(56) References Cited

U.S. PATENT DOCUMENTS

| | | |
|---|---|---|
| 3,935,933 A | 2/1976 | Tanaka et al. |
| 4,011,433 A | 3/1977 | Tateisi et al. |
| 4,108,350 A | 8/1978 | Forbes, Jr. |
| 4,124,109 A | 11/1978 | Bissell et al. |
| 4,195,864 A | 4/1980 | Morton et al. |

(Continued)

FOREIGN PATENT DOCUMENTS

| | | |
|---|---|---|
| AU | 200039412 A1 | 12/2000 |
| BE | 1002756 A6 | 5/1991 |

(Continued)

OTHER PUBLICATIONS

"Internet based secure transactions using encrypting applets and cgi-scripts Independent of browser or server capabilities"; 1998, IBM Research Disclosure, No. 410116, pp. 800-801.

(Continued)

*Primary Examiner* — Daniel Lastra
(74) *Attorney, Agent, or Firm* — Kilpatrick Townsend & Stockton LLP

(57) ABSTRACT

The present invention generally relates to providing a status for one or more rewards using a format in a plurality of display formats. Portable device information associated with a portable device and acceptance point device information associated with an acceptance point device are determined. A status for one or more rewards is determined based on the portable device information and the acceptance point device information. A display format is then determined from a plurality of display formats based on the portable device information and acceptance point device information. A status is then displayed using the display format.

20 Claims, 9 Drawing Sheets

(56) References Cited

U.S. PATENT DOCUMENTS

| | | |
|---|---|---|
| 4,412,631 A | 11/1983 | Haker |
| 4,544,590 A | 10/1985 | Egan |
| 4,568,403 A | 2/1986 | Egan |
| 4,674,041 A | 6/1987 | Lemon et al. |
| 4,723,212 A | 2/1988 | Mindrum et al. |
| 4,742,215 A | 5/1988 | Daughters et al. |
| 4,794,530 A | 12/1988 | Yukiura et al. |
| 4,825,053 A | 4/1989 | Caille |
| 4,837,422 A | 6/1989 | Dethloff et al. |
| 4,841,712 A | 6/1989 | Roou |
| 4,868,376 A | 9/1989 | Lessin et al. |
| 4,882,675 A | 11/1989 | Nichtberger et al. |
| 4,910,672 A | 3/1990 | Off et al. |
| 4,930,129 A | 5/1990 | Takahira |
| 4,941,090 A | 7/1990 | McCarthy |
| 4,949,256 A | 8/1990 | Humble |
| 4,954,003 A | 9/1990 | Shea |
| 4,985,615 A | 1/1991 | Iijima |
| 4,992,940 A | 2/1991 | Dworkin |
| 5,019,452 A | 5/1991 | Watanabe et al. |
| 5,019,695 A | 5/1991 | Itako |
| 5,025,372 A | 6/1991 | Burton et al. |
| 5,056,019 A | 10/1991 | Schultz et al. |
| 5,060,793 A | 10/1991 | Hyun et al. |
| 5,060,804 A | 10/1991 | Beales et al. |
| 5,063,596 A | 11/1991 | Dyke |
| 5,115,888 A | 5/1992 | Schneider |
| 5,117,355 A | 5/1992 | McCarthy |
| 5,128,752 A | 7/1992 | Von Kohorn |
| 5,161,256 A | 11/1992 | Iijima |
| 5,173,851 A | 12/1992 | Off et al. |
| 5,185,695 A | 2/1993 | Pruchnicki |
| 5,200,889 A | 4/1993 | Mori |
| 5,202,826 A | 4/1993 | McCarthy |
| 5,227,874 A | 7/1993 | Von Kohorn |
| 5,256,863 A | 10/1993 | Ferguson et al. |
| 5,285,278 A | 2/1994 | Holman |
| 5,287,181 A | 2/1994 | Holman |
| 5,287,268 A | 2/1994 | McCarthy |
| 5,299,834 A | 4/1994 | Kraige |
| 5,308,120 A | 5/1994 | Thompson |
| 5,353,218 A | 10/1994 | De Lapa et al. |
| 5,380,991 A | 1/1995 | Valencia et al. |
| RE34,915 E | 4/1995 | Nichtberger et al. |
| 5,402,549 A | 4/1995 | Forrest |
| 5,417,458 A | 5/1995 | Best et al. |
| 5,420,606 A | 5/1995 | Begum et al. |
| 5,450,938 A | 9/1995 | Rademacher |
| 5,466,010 A | 11/1995 | Spooner |
| 5,471,669 A | 11/1995 | Lidman |
| 5,473,690 A | 12/1995 | Grimonprez et al. |
| 5,483,444 A | 1/1996 | Heintzeman et al. |
| 5,484,998 A | 1/1996 | Bejnar et al. |
| 5,491,326 A | 2/1996 | Marceau et al. |
| 5,491,838 A | 2/1996 | Takahisa et al. |
| 5,500,681 A | 3/1996 | Jones |
| 5,501,491 A | 3/1996 | Thompson |
| 5,513,102 A | 4/1996 | Auriemma |
| 5,515,270 A | 5/1996 | Weinblatt |
| 5,530,232 A | 6/1996 | Taylor |
| 5,531,482 A | 7/1996 | Blank |
| 5,535,118 A | 7/1996 | Chumbley |
| 5,537,314 A | 7/1996 | Kanter |
| 5,559,313 A | 9/1996 | Claus et al. |
| 5,564,073 A | 10/1996 | Takahisa |
| 5,577,266 A | 11/1996 | Takahisa et al. |
| 5,577,915 A | 11/1996 | Feldman |
| 5,578,808 A | 11/1996 | Taylor |
| 5,579,537 A | 11/1996 | Takahisa |
| 5,594,493 A | 1/1997 | Nemirofsky |
| 5,612,868 A | 3/1997 | Off et al. |
| 5,621,812 A | 4/1997 | Deaton et al. |
| 5,642,485 A | 6/1997 | Deaton et al. |
| 5,644,723 A | 7/1997 | Deaton et al. |
| 5,649,114 A | 7/1997 | Deaton et al. |
| 5,649,118 A | 7/1997 | Carlisle et al. |
| 5,650,209 A | 7/1997 | Ramsburg et al. |
| 5,687,322 A | 11/1997 | Deaton et al. |
| 5,689,100 A | 11/1997 | Carrithers et al. |
| 5,710,886 A | 1/1998 | Christensen et al. |
| 5,727,153 A | 3/1998 | Powell |
| 5,734,838 A | 3/1998 | Robinson et al. |
| 5,742,845 A | 4/1998 | Wagner |
| 5,754,762 A | 5/1998 | Kuo et al. |
| 5,761,648 A | 6/1998 | Golden et al. |
| 5,765,141 A | 6/1998 | Spector |
| 5,767,896 A | 6/1998 | Nemirofsky |
| 5,774,870 A | 6/1998 | Storey |
| 5,776,287 A | 7/1998 | Best et al. |
| 5,791,991 A | 8/1998 | Small |
| 5,794,210 A | 8/1998 | Goldhaber et al. |
| 5,797,126 A | 8/1998 | Helbling et al. |
| 5,802,519 A | 9/1998 | De Jong |
| 5,804,806 A | 9/1998 | Haddad et al. |
| 5,806,044 A | 9/1998 | Powell |
| 5,806,045 A | 9/1998 | Biorge et al. |
| 5,815,658 A | 9/1998 | Kuriyama |
| 5,822,735 A | 10/1998 | De Lapa et al. |
| 5,822,737 A | 10/1998 | Ogram |
| 5,832,457 A | 11/1998 | O'Brien et al. |
| 5,844,218 A | 12/1998 | Kawan et al. |
| 5,845,259 A | 12/1998 | West et al. |
| 5,855,007 A | 12/1998 | Jovicic et al. |
| 5,857,175 A | 1/1999 | Day et al. |
| 5,859,419 A | 1/1999 | Wynn |
| RE36,116 E | 2/1999 | McCarthy |
| 5,865,340 A | 2/1999 | Alvern |
| 5,865,470 A | 2/1999 | Thompson |
| 5,868,498 A | 2/1999 | Martin |
| 5,880,769 A | 3/1999 | Nemirofsky et al. |
| 5,884,271 A | 3/1999 | Pitroda |
| 5,884,277 A | 3/1999 | Khosla |
| 5,884,278 A | 3/1999 | Powell |
| 5,887,271 A | 3/1999 | Powell |
| 5,890,135 A | 3/1999 | Powell |
| 5,892,827 A | 4/1999 | Beach et al. |
| 5,898,838 A | 4/1999 | Wagner |
| 5,903,732 A | 5/1999 | Reed et al. |
| 5,905,246 A | 5/1999 | Fajkowski |
| 5,905,908 A | 5/1999 | Wagner |
| 5,907,350 A | 5/1999 | Nemirofsky |
| 5,907,830 A | 5/1999 | Engel et al. |
| 5,909,486 A | 6/1999 | Walker et al. |
| 5,912,453 A | 6/1999 | Gungl et al. |
| 5,915,244 A | 6/1999 | Jack et al. |
| 5,923,884 A | 7/1999 | Peyret et al. |
| 5,924,072 A | 7/1999 | Havens |
| 5,926,795 A | 7/1999 | Williams |
| 5,928,082 A | 7/1999 | Clapper, Jr. |
| 5,931,947 A | 8/1999 | Burns et al. |
| 5,943,651 A | 8/1999 | Oosawa |
| 5,950,173 A | 9/1999 | Perkowski |
| 5,953,047 A | 9/1999 | Nemirofsky |
| 5,953,705 A | 9/1999 | Oneda |
| 5,956,694 A | 9/1999 | Powell |
| 5,956,695 A | 9/1999 | Carrithers et al. |
| 5,958,174 A | 9/1999 | Ramsberg et al. |
| 5,960,082 A | 9/1999 | Haenel |
| 5,963,917 A | 10/1999 | Ogram |
| 5,969,318 A | 10/1999 | Mackenthun |
| 5,970,469 A | 10/1999 | Scroggie et al. |
| 5,974,399 A | 10/1999 | Giuliani et al. |
| 5,974,549 A | 10/1999 | Golan |
| 5,978,013 A | 11/1999 | Jones et al. |
| 5,987,795 A | 11/1999 | Wilson |
| 5,997,042 A | 12/1999 | Blank |
| 6,000,608 A | 12/1999 | Dorf |
| 6,002,771 A | 12/1999 | Nielsen |
| 6,003,113 A | 12/1999 | Hoshino |
| 6,003,134 A | 12/1999 | Kuo et al. |
| 6,005,942 A | 12/1999 | Chan et al. |
| 6,009,411 A | 12/1999 | Kepecs |
| 6,012,635 A | 1/2000 | Shimada et al. |
| 6,014,634 A | 1/2000 | Scroggie et al. |

(56) References Cited

U.S. PATENT DOCUMENTS

| | | | |
|---|---|---|---|
| 6,024,286 | A | 2/2000 | Bradley et al. |
| 6,024,288 | A | 2/2000 | Gottlich et al. |
| 6,035,280 | A | 3/2000 | Christensen |
| 6,038,551 | A | 3/2000 | Barlow et al. |
| 6,041,309 | A | 3/2000 | Laor |
| 6,047,325 | A | 4/2000 | Jain et al. |
| 6,049,778 | A | 4/2000 | Walker et al. |
| 6,052,468 | A | 4/2000 | Hillhouse |
| 6,052,690 | A | 4/2000 | de Jong |
| 6,052,785 | A | 4/2000 | Lin et al. |
| 6,055,509 | A | 4/2000 | Powell |
| 6,061,660 | A | 5/2000 | Eggleston et al. |
| 6,067,526 | A | 5/2000 | Powell |
| 6,070,147 | A | 5/2000 | Harms et al. |
| 6,073,238 | A | 6/2000 | Drupsteen |
| 6,076,068 | A | 6/2000 | DeLapa et al. |
| 6,076,069 | A | 6/2000 | Laor |
| 6,089,611 | A | 7/2000 | Blank |
| 6,094,656 | A | 7/2000 | De Jong |
| 6,101,422 | A | 8/2000 | Furlong |
| 6,101,477 | A | 8/2000 | Hohle et al. |
| 6,105,002 | A | 8/2000 | Powell |
| 6,105,865 | A | 8/2000 | Hardesty |
| 6,105,873 | A | 8/2000 | Jeger |
| 6,112,987 | A | 9/2000 | Lambert et al. |
| 6,112,988 | A | 9/2000 | Powell |
| 6,119,933 | A | 9/2000 | Wong et al. |
| 6,119,945 | A | 9/2000 | Muller et al. |
| 6,122,631 | A | 9/2000 | Berbec et al. |
| 6,129,274 | A | 10/2000 | Suzuki |
| 6,144,948 | A | 11/2000 | Walker et al. |
| 6,151,586 | A | 11/2000 | Brown |
| 6,151,587 | A | 11/2000 | Matthias |
| 6,154,751 | A | 11/2000 | Ault et al. |
| 6,161,870 | A | 12/2000 | Blank |
| 6,164,549 | A | 12/2000 | Richards |
| 6,170,061 | B1 | 1/2001 | Beser |
| 6,173,269 | B1 | 1/2001 | Solokl et al. |
| 6,173,891 | B1 | 1/2001 | Powell |
| 6,179,205 | B1 | 1/2001 | Sloan |
| 6,179,710 | B1 | 1/2001 | Sawyer et al. |
| 6,183,017 | B1 | 2/2001 | Najor et al. |
| 6,185,541 | B1 | 2/2001 | Scroggie et al. |
| 6,189,100 | B1 | 2/2001 | Barr et al. |
| 6,189,787 | B1 | 2/2001 | Dorf |
| 6,195,666 | B1 | 2/2001 | Schneck et al. |
| 6,210,276 | B1 | 4/2001 | Mullins |
| 6,216,014 | B1 | 4/2001 | Proust et al. |
| 6,216,204 | B1 | 4/2001 | Thiriet |
| 6,220,510 | B1 | 4/2001 | Everett et al. |
| 6,222,914 | B1 | 4/2001 | McMullin |
| 6,230,143 | B1 | 5/2001 | Simons et al. |
| 6,237,145 | B1 | 5/2001 | Narasimhan et al. |
| 6,241,287 | B1 | 6/2001 | Best et al. |
| 6,243,687 | B1 | 6/2001 | Powell |
| 6,243,688 | B1 | 6/2001 | Kalina |
| 6,244,958 | B1 | 6/2001 | Acres |
| 6,266,647 | B1 | 7/2001 | Fernandez |
| 6,267,263 | B1 | 7/2001 | Emoff et al. |
| 6,269,158 | B1 | 7/2001 | Kim |
| 6,279,112 | B1 | 8/2001 | O'Toole, Jr. et al. |
| 6,282,516 | B1 | 8/2001 | Giuliani |
| 6,292,785 | B1 | 9/2001 | McEvoy et al. |
| 6,292,786 | B1 | 9/2001 | Deaton et al. |
| 6,296,191 | B1 | 10/2001 | Hamann et al. |
| 6,299,530 | B1 | 10/2001 | Hansted et al. |
| 6,321,208 | B1 | 11/2001 | Barnett et al. |
| 6,385,723 | B1 | 5/2002 | Richards |
| 6,390,374 | B1 | 5/2002 | Carper et al. |
| 6,480,935 | B1 | 11/2002 | Carper et al. |
| 6,549,773 | B1 | 4/2003 | Linden et al. |
| 6,549,912 | B1 | 4/2003 | Chen |
| 6,612,490 | B1 | 9/2003 | Herrendoerfer et al. |
| 6,681,995 | B2 | 1/2004 | Sukeda et al. |
| 6,689,345 | B2 | 2/2004 | Jager Lezer |
| 8,554,610 | B1 * | 10/2013 | Costello et al. ............... 705/14.1 |
| 2001/0016827 | A1 | 8/2001 | Fernandez |
| 2001/0054003 | A1 | 12/2001 | Chien et al. |
| 2002/0002468 | A1 | 1/2002 | Spagna et al. |
| 2002/0028708 | A1 | 3/2002 | Busch et al. |
| 2002/0076051 | A1 | 6/2002 | Nii |
| 2002/0128908 | A1 | 9/2002 | Levin et al. |
| 2003/0004802 | A1 | 1/2003 | Callegari |
| 2003/0075600 | A1 | 4/2003 | Struthers et al. |
| 2003/0158818 | A1 | 8/2003 | George et al. |
| 2003/0167206 | A1 | 9/2003 | Shirai |
| 2004/0148224 | A1 | 7/2004 | Gauthier et al. |

FOREIGN PATENT DOCUMENTS

| | | |
|---|---|---|
| CA | 2293944 | 8/2000 |
| CA | 2267041 | 9/2000 |
| CA | 2317138 A1 | 1/2002 |
| DE | 19522527 A1 | 1/1997 |
| DE | 19848712 A1 | 4/2000 |
| DE | 19960978 A1 | 8/2000 |
| DE | 10015103 A1 | 10/2000 |
| EP | 203424 A2 | 12/1986 |
| EP | 292248 A2 | 11/1988 |
| EP | 475837 A1 | 3/1992 |
| EP | 540095 A1 | 5/1993 |
| EP | 658862 A2 | 6/1995 |
| EP | 675614 A1 | 10/1995 |
| EP | 682327 A2 | 11/1995 |
| EP | 875841 A2 | 11/1998 |
| EP | 936530 A1 | 8/1999 |
| EP | 938050 A2 | 8/1999 |
| EP | 938051 A2 | 8/1999 |
| EP | 944007 A2 | 9/1999 |
| EP | 949595 A2 | 10/1999 |
| EP | 982692 A2 | 3/2000 |
| EP | 984404 A2 | 3/2000 |
| EP | 1085395 A2 | 3/2001 |
| EP | 1102320 A1 | 5/2001 |
| EP | 1111505 A1 | 6/2001 |
| EP | 1113387 A2 | 7/2001 |
| EP | 1113407 A2 | 7/2001 |
| EP | 1168137 A1 | 1/2002 |
| EP | 1233333 A1 | 8/2002 |
| FR | 2772957 A1 | 6/1999 |
| FR | 2794543 A1 | 8/2000 |
| FR | 2793048 A1 | 11/2000 |
| FR | 2796176 A1 | 1/2001 |
| FR | 2804234 A1 | 7/2001 |
| GB | 2331381 A | 5/1999 |
| GB | 2343091 A | 4/2000 |
| GB | 2351379 A | 12/2000 |
| GB | 2355324 A | 4/2001 |
| JP | 2000-112864 A | 4/2000 |
| JP | 2000-181764 A | 6/2000 |
| JP | 2001-202484 A | 7/2001 |
| JP | 2001-236232 A | 8/2001 |
| KR | 2001039297 A | 5/2001 |
| KR | 2001044823 A | 6/2001 |
| KR | 2001058742 A | 7/2001 |
| KR | 2002021237 A | 3/2002 |
| WO | WO 90/16126 A1 | 12/1990 |
| WO | WO 96/25724 A1 | 8/1996 |
| WO | WO 96/38945 A1 | 12/1996 |
| WO | WO 96/42109 A1 | 12/1996 |
| WO | WO 97/05582 A1 | 2/1997 |
| WO | WO 97/10562 A1 | 3/1997 |
| WO | WO 97/39424 A1 | 10/1997 |
| WO | WO 98/02834 A1 | 1/1998 |
| WO | WO 98/09257 A1 | 3/1998 |
| WO | WO 98/20465 A1 | 5/1998 |
| WO | WO 98/43169 A2 | 10/1998 |
| WO | WO 98/43212 A1 | 10/1998 |
| WO | WO 98/52153 A2 | 11/1998 |
| WO | WO 99/10824 A1 | 3/1999 |
| WO | WO 99/16030 A1 | 4/1999 |
| WO | WO 99/19846 A2 | 4/1999 |
| WO | WO 99/44172 A1 | 9/1999 |
| WO | WO 99/45507 A1 | 9/1999 |

(56) References Cited

FOREIGN PATENT DOCUMENTS

| | | |
|---|---|---|
| WO | WO 99/49415 A2 | 9/1999 |
| WO | WO 99/49426 A1 | 9/1999 |
| WO | WO 00/39714 A1 | 7/2000 |
| WO | WO 00/46665 A2 | 8/2000 |
| WO | WO 00/54507 A1 | 9/2000 |
| WO | WO 00/57315 A2 | 9/2000 |
| WO | WO 00/57613 A1 | 9/2000 |
| WO | WO 00/62265 A1 | 10/2000 |
| WO | WO 00/62472 A1 | 10/2000 |
| WO | WO 00/67185 A1 | 11/2000 |
| WO | WO 00/68797 A1 | 11/2000 |
| WO | WO 00/68902 A1 | 11/2000 |
| WO | WO 00/68903 A1 | 11/2000 |
| WO | WO 00/69183 A2 | 11/2000 |
| WO | WO 00/75775 A2 | 12/2000 |
| WO | WO 00/77750 A1 | 12/2000 |
| WO | WO 00/79411 A2 | 12/2000 |
| WO | WO 01/04851 A1 | 1/2001 |
| WO | WO 01/06341 A1 | 1/2001 |
| WO | WO 01/08087 A1 | 2/2001 |
| WO | WO 01/13572 A1 | 2/2001 |
| WO | WO 01/15397 A1 | 3/2001 |
| WO | WO 01/18633 A1 | 3/2001 |
| WO | WO 01/18746 A1 | 3/2001 |
| WO | WO 01/29672 A1 | 4/2001 |
| WO | WO 01/33390 A2 | 5/2001 |
| WO | WO 01/40908 A2 | 6/2001 |
| WO | WO 01/42887 A2 | 6/2001 |
| WO | WO 01/44900 A2 | 6/2001 |
| WO | WO 01/44949 A2 | 6/2001 |
| WO | WO 01/47176 A1 | 6/2001 |
| WO | WO 01/50229 A2 | 7/2001 |
| WO | WO 01/52575 A1 | 7/2001 |
| WO | WO 01/55955 A1 | 8/2001 |
| WO | WO 01/59563 A1 | 8/2001 |
| WO | WO 01/61620 A1 | 8/2001 |
| WO | WO 01/65545 A2 | 9/2001 |
| WO | WO 01/67694 A1 | 9/2001 |
| WO | WO 01/71648 A2 | 9/2001 |
| WO | WO 01/71679 A2 | 9/2001 |
| WO | WO 01/73530 A2 | 10/2001 |
| WO | WO 01/73533 A1 | 10/2001 |
| WO | WO 01/78020 A1 | 10/2001 |
| WO | WO 01/80563 A1 | 10/2001 |
| WO | WO 01/84377 A2 | 11/2001 |
| WO | WO 01/84474 A2 | 11/2001 |
| WO | WO 01/84512 A1 | 11/2001 |
| WO | WO 01/88705 A1 | 11/2001 |
| WO | WO 02/06948 A1 | 1/2002 |
| WO | WO 02/10962 A1 | 2/2002 |
| WO | WO 02/14991 A2 | 2/2002 |
| WO | WO 02/15037 A1 | 2/2002 |
| WO | WO 02/21315 A1 | 3/2002 |
| WO | WO 02/29577 A2 | 4/2002 |
| WO | WO 02/088895 A2 | 11/2002 |

OTHER PUBLICATIONS

Office Action issued on Apr. 1, 2008 in U.S. Appl. No. 10/651,908, filed Aug. 29, 2003, 19 pages.
Office Action issued on Nov. 3, 2008 in U.S. Appl. No. 10/651,908, filed Aug. 29, 2003, 23 pages.
Office Action issued on Apr. 10, 2009 in U.S. Appl. No. 10/651,908, filed Aug. 29, 2003, 21 pages.
Office Action issued on Nov. 2, 2009 in U.S Appl. No. 10/651,908, filed Aug. 29, 2003, 14 pages.
Office Action issued on May 4, 2009 in U.S. Appl. No. 10/651,908, filed Aug. 29, 2003, 16 pages.
Office Action issued on Sep. 22, 2010 in U.S Appl. No. 10/651,908, filed Aug. 29, 2003, 17 pages.
Office Action issued on Apr. 15, 2011 in U.S. Appl. No. 10/651,908, filed Aug. 29, 2003, 18 pages.
Allowance issued on Jun. 7, 2013 in U.S. Appl. No. 10/651,908, filed Aug. 29, 2003, 9 pages.

* cited by examiner

```
            Merchant ABC
            123 Main Street
       Any town, Any state USA Sale
VISA    XXXXXXXXXXXX5375
Exp:   06/03
08/31/01          09:12:49

Inv#:   000012
Appr Code:   DEMO12

Total:$       80.00

THANK YOU!
```

```
          CUSTOMER COPY
          CONGRATULATIONS!
       20% OFF YOUR PURCHASE
```
Original Amount $ 100
Discount $20

```
       ************************
PID: 10001 - Get 20% off every
$100 spent.
Balance: $0.00 of $100

<Repeated for all programs>
```

902 — (pointing to "Balance: $0.00 of $100")

FIG. 9

METHOD AND SYSTEM FOR PROVIDING REWARD STATUS

CROSS-REFERENCE TO RELATED APPLICATION

This application is a continuation of U.S. patent application Ser. No. 10/651,908, filed Aug. 29, 2003, now U.S. Pat. No. 8,554,610, issued Oct. 8, 2013, entitled "METHOD AND SYSTEM FOR PROVIDING REWARD STATUS", the disclosure of which is hereby incorporated by reference in its entirety for all purposes.

BACKGROUND OF THE INVENTION

The present generally relates to loyalty programs and more specifically to apparatus and methods for providing a status for one or more rewards using customized formatting.

Loyalty programs are programs that provide users with incentives to shop at certain merchants participating in the loyalty programs. Typically, users are awarded rewards when they shop at the merchants participating in that loyalty program. The rewards may then be redeemed.

Loyalty programs typically offer rewards that are straightforward. For example, a typical loyalty program may be "buy a certain amount of this product, and receive this reward". The status of this kind of loyalty program can be communicated to a user in a receipt using a text display. The representation may print the number of products purchased and the number of products needed to qualify for a reward.

As loyalty programs become more complicated, it becomes difficult to represent the status of the programs using a text representation on a receipt. For example, as a user becomes eligible for multiple loyalty programs that include multiple products and multiple rewards, the amount of text that is needed to communicate the status in the loyalty programs for the on receipt increases. It becomes hard to clearly communicate a status of all eligible loyalty programs. Thus, a user may not even read the text representation of the status for the loyalty programs. Accordingly, the benefits of providing the status of the loyalty programs are minimized.

Consequently, improved apparatus and methods for providing a status for one or more rewards in one or more loyalty programs are desired.

BRIEF SUMMARY OF THE INVENTION

Embodiments of the present invention generally relate to providing a status for one or more rewards using a format in a plurality of display formats. In one embodiment, portable device information associated with a portable device and acceptance point device information associated with an acceptance point device are determined. A status for one or more rewards is determined based on the portable device information and the acceptance point device information. A display format is then determined from a plurality of display formats based on the portable device information and acceptance point device information. A status is then displayed using the display format.

In one embodiment, a method for providing a status for one or more rewards using a plurality of display formats is provided. Each display format displays the status in a different format. The method comprises: determining portable device information associated with a portable device; determining acceptance point device information associated with an acceptance point device; determining a status for one or more rewards for the portable device based on the portable device information and the acceptance point device information; determining a display format in the plurality of display formats based on the portable device information and the acceptance point device information; and outputting the status using the display format.

In another embodiment, a method for outputting a status for one or more loyalty programs is provided. The method comprises: determining a current status in one or more loyalty programs; determining a reward status in the one or more loyalty programs, the reward status including a position where a reward is earned for the one or more loyalty programs; determining a desired status for one or more desired loyalty programs, the desired status including a position where a reward for the one or more desired loyalty programs other than the one or more loyalty programs is earned; determining a format to display the desired status with the current status and reward status; and outputting the current status, reward status, and desired status using the determined format.

In yet another embodiment, a method for outputting a status for one or more loyalty programs is provided. The method comprises: determining a reward status in the one or more loyalty programs, the reward status including a position where a reward is earned for the one or more loyalty programs; determining a triggering amount for the one or more loyalty programs, the triggering amount being an amount that is needed to earn the reward for the one or more loyalty programs; determining a format to represent the triggering amount with the reward status; and outputting the triggering amount and reward status using the determined format.

In another embodiment, a system for determining display formats for loyalty transactions is provided. The system comprises: a plurality of portable devices, each portable device including portable device information specific to the portable device; a plurality of acceptance point devices, each acceptance point device including acceptance point device information specific to the acceptance point device and a plurality of display formats; wherein the plurality of portable devices participate in transactions with the plurality of acceptance point devices, each transaction including status information; wherein a display format for the status information for each transaction varies depending on portable device information for a portable device in the plurality of portable devices and an acceptance point device information for an acceptance point device in the plurality of acceptance point devices, the display format being transaction specific.

In another embodiment, an apparatus for determining and displaying a status in one or more loyalty programs is provided. The apparatus comprises: a receiver configured to communicate with a portable device to determine portable device information associated with the portable device; loyalty program information associated with one or more loyalty programs that are supported by the apparatus; logic to determine a current status, reward status, and desired status for one or more rewards of the one or more loyalty programs for the portable device based on the portable device information and the loyalty program information; logic to determine a display format based on the portable device information and the loyalty program information; and an output device configured to output the current status, reward status, and desired status based on the display format.

In another embodiment, a system for determining display formats for loyalty transactions is provided. The system comprises: a plurality of portable devices, each portable device including portable device information specific to the portable device; a plurality of acceptance point devices, each acceptance point device including acceptance point device information specific to the acceptance point device and a plurality of display formats; wherein the plurality of portable devices participate in transactions with the plurality of acceptance point devices, each transaction including status information; wherein a display format for the status information for each transaction varies depending on portable device information for a portable device in the plurality of portable devices and an acceptance point device information for an acceptance point device in the plurality of acceptance point devices, the display format being transaction specific.

A further understanding of the nature and advantages of the invention herein may be realized by reference of the remaining portions in the specifications and the attached drawings.

BRIEF DESCRIPTION OF THE DRAWINGS

FIGS. 5-9 depict embodiments of display formats according to embodiments of the present invention.

DETAILED DESCRIPTION OF THE INVENTION

Figure 1:
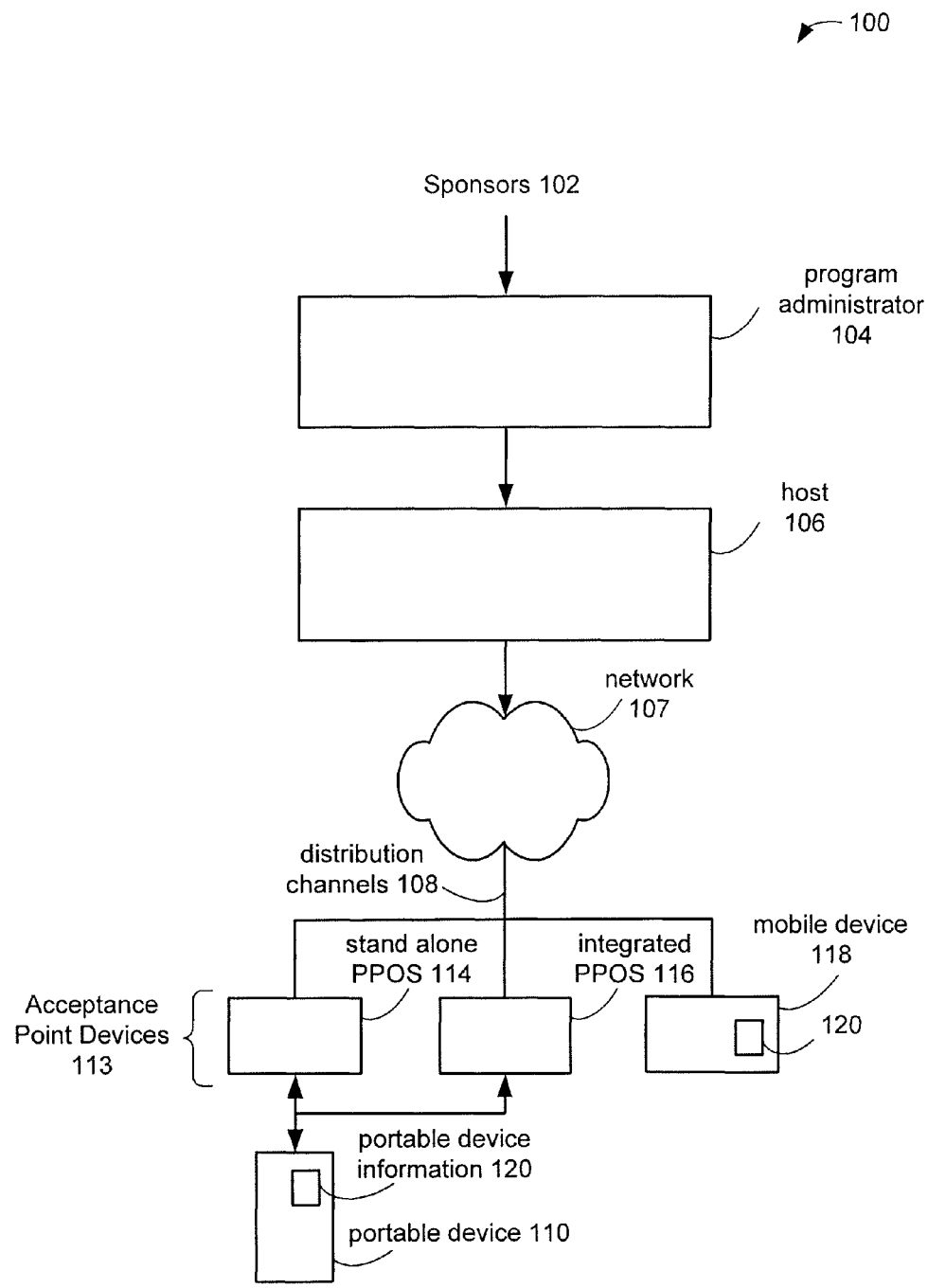
FIG. 1 depicts a system for providing a status for one or more loyalty programs according to one embodiment of the present invention.

FIG. 1 depicts a system 100 for providing a status for one or more loyalty programs according to one embodiment of the present invention. System 100 includes sponsors 102, a program administer 104, a host 106, a network 107, acceptance point devices 113, and one or more portable devices 110.

One or more sponsors 102 are providers of prizes and incentives for loyalty programs. Sponsors 102 are any entities, such as product manufacturers, that can sponsor a loyalty program. Sponsors 102 typically define the parameters of how a loyalty program is provided. This information may include the rewards that are awarded, the requirements that define whether a reward should be awarded, the eligible participants, and any information for formatting status information for loyalty programs.

Once sponsors 102 define a respective loyalty program, a program administrator 104 receives the information for the loyalty programs and translates the information into a format readable by host 106. The translated information is outputted to host 106.

Host 106 is a central administrator of all loyalty programs for system 100. Host 106 receives the information from program administrator 104 and can selectively download the information through a network 107 to a plurality of acceptance point devices 113.

Network 107 may be any network, such as the Internet, a wireless network, a wire line network, a local area network (LAN), a wide area network (WAN), and the like. In one embodiment, the loyalty parameter may be selectively downloaded to certain acceptance point devices 113. For example, loyalty programs may be downloaded through applicable distribution channels 108 that will be offering the loyalty program.

Distribution channels 108 include one or more acceptance point devices 113 capable of performing a loyalty transaction. In one embodiment, acceptance point devices 113 include a standalone physical point of sale (PPOS) device 114, an integrated physical point of sale device 116, and a mobile device 118. Acceptance point devices 113 may perform loyalty transactions offline. In one embodiment, offline indicates that acceptance point device 113 does not need to communicate with host 106 to perform the loyalty transaction or to determine eligible incentives for a loyalty transaction. Acceptance point device 113 may, however, communicate with host 106 for other reasons, such as for reporting results of transactions, etc.

Stand alone PPOS 114 is a stand alone device dedicated to performing point of sale transactions. For example, PPOS 114 includes a point of sale device, computing devices, personal digital assistants, kiosks, etc. Point of sale devices found in merchants' stores are examples of stand alone PPOS devices 114.

Integrated PPOS 116 may be a point of sale or acceptance point device that has been integrated into another device, such as a computer. For example, integrated PPOS 116 may be an application on the World Wide Web (WWW) accessed through a computing device over the Internet. A website for shopping on the Internet and a card acceptance device may be an example of PPOS 116.

Mobile devices 118 include any mobile devices, such as cellular phones, personal digital assistants (PDA), pocket personal computers (PCs), laptop computers, tablet computers, etc. One difference between mobile devices 118 and PPOS devices 114 and 116 is that PPOS devices 114 and 116 communicate with a portable device 110 in order to enable a loyalty transaction. Mobile devices 118, however, may not communicate with portable device 110 because mobile devices 118 are a portable device 110 and may also perform the functions of acceptance point device 113 together.

Portable devices 110 are devices that are used by loyalty program participants to conduct loyalty transactions. For example, portable devices 110 include smartcards, cellular phones, personal digital assistants (PDAs), pagers, payment cards, security cards, access cards, smart media, transponders, and the like. Each portable device 110 includes a module, such as a computer chip with dedicated hardware, software, embedded software, or any combination thereof, that is used to perform actions associated with loyalty transactions.

Portable devices 110 include portable device information 120. Similarly, mobile devices 118 also include portable device information 120. Portable device information 120 includes any information that uniquely identifies either portable device 110 or mobile device 118. For example, portable device information 120 may be an identifier, a unique ID, a serial number, an account number, etc. Thus, a user that is associated with portable device 110 or mobile device 118 may be uniquely identified using portable device information 120. Also, portable device information 120 includes any other information related to a loyalty program, such as information on which loyalty programs portable device 110 is eligible for and status information for the loyalty programs.

A transaction is typically performed between portable device 110 and stand alone PPOS 114 or integrated PPOS 116. In another embodiment, mobile devices 118 may participate in a loyalty transaction. In this case, mobile device 118 performs the transaction with a stand alone PPOS 114, an integrated PPOS 116 or a host 106, where host 106 performs the functionality of stand alone PPOS 114 or integrated PPOS 116. For discussion and illustrative purposes, it will be described that a transaction is being performed between portable device 110 and acceptance point device 113. It should be understood, however, that the transaction may be between portable device 110 and PPOS 114 and/or 116, or mobile devices 118 and host 106.

A transaction between portable device 110 and acceptance point device 113 may be a loyalty transaction under a loyalty program. For example, a loyalty transaction is where a user of portable device 110 is purchasing items that qualify the user and portable device 110 for one or more incentives or rewards in the loyalty program. Incentives or rewards offer something of value for a user.

Embodiments of the present invention are configured to provide a status for one or more rewards for one or more portable devices 110. In one embodiment, a status is displayed using a display format that is selected based on information associated with portable device 110 and acceptance point device 113. Display formats may vary between different portable devices 110 and acceptance point devices 113. Thus, status information may be customized on a per-transaction basis based on portable device 110 and acceptance point device 113 participating in the transaction.

Figure 2:
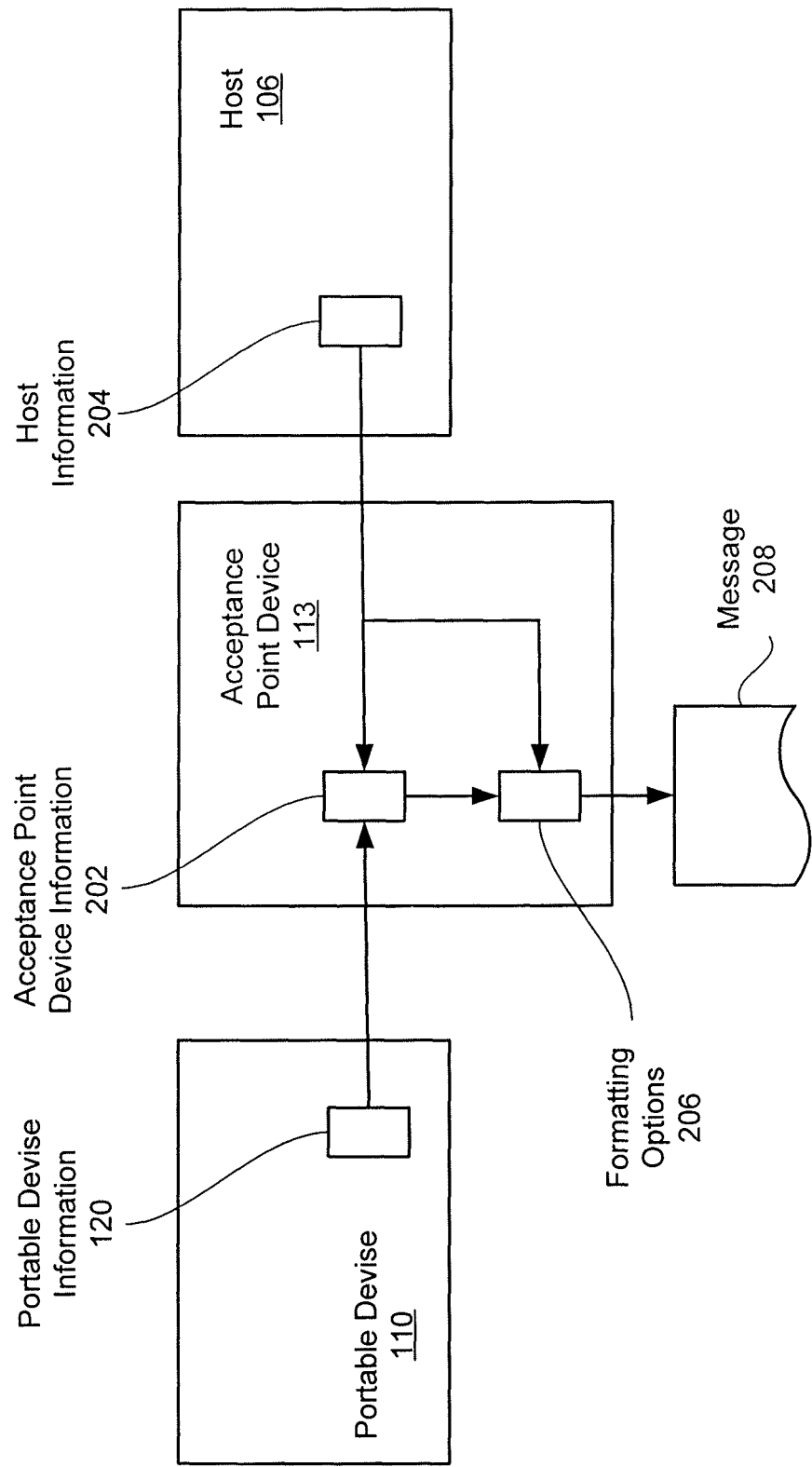
FIG. 2 illustrates a block diagram of a system for providing a status for one or more rewards using a display format according to one embodiment of the present invention.

FIG. 2 illustrates a block diagram of a system 200 for providing a status for one or more rewards using a display format according to one embodiment of the present invention. System 200 includes portable device 110, acceptance point device 113, and host 106.

Host 106 includes host information 204. In one embodiment, host information 204 may include any information for loyalty programs that may be downloaded to acceptance point device 113. In one embodiment, host information 204 may include status information for a portable device 110. For example, as transactions are processed at acceptance point device 113, information for the transactions are downloaded to host 106. Host 106 stores the information for portable device 110 and, from time to time, may download the status information to acceptance point device 113. In another embodiment, acceptance point device 113 may communicate with host 106 to determine the status information at the time of issuance of a reward, for example for a lost or stolen card.

Although host 106 may include status information, portable device 110 may include status information that may be different from the status information found in host information 204. For example, status information may be downloaded to host 106 from acceptance point device 113 at certain intervals (e.g., at the end of the day, week, etc.). Portable device 110 may participate in transactions that cause the status information to be different than status information stored at host 106. The up-to-date status information is stored as portable device information 120. Thus, portable device information 120 may be used to determine status information when a transaction is processed between portable device 110 and acceptance point device 113.

Acceptance point device 113 receives the information for loyalty programs from host 106. The information defines the programs that are supported by acceptance point device 113. Each loyalty program includes parameters that define the rewards of a loyalty program. This information is used in determining if a user is eligible for a reward and is stored as acceptance point device information 202.

Acceptance point device 113 may also receive information for display formats 206. The information may include different formats that are used to output status information. For example, display formats 206 may include graphical formats and/or text formats. Examples of these formats will be described in more detail below. The determination of which display format 206 to use may depend on information determined for the transaction. For example, portable device information 120 and acceptance point device information 202 may be used to determine a display format 206 for a transaction.

During a transaction, acceptance point device 113 communicates with portable device 110 to determine portable device information 120. Portable device information 120 is information unique to portable device 110 may include status information for loyalty programs that portable device 110 is eligible for. Acceptance point device 113 determines if the loyalty programs associated with portable device 110 are supported using acceptance point device information 202. If the loyalty program's portable device 110 is eligible for are supported by acceptance point device 113, acceptance point device 113 determines status information for the loyalty programs.

Because portable device information 120 and acceptance point device information 202 vary, the display formats may vary from transaction to transaction. Thus, status information and how status information is displayed varies between different portable devices 110 and acceptance point devices 113. Also, the same user associated with portable 110 may be presented with varying messages at different acceptance point devices 113 and two different users with different portable devices 110 may be presented with different messages at the same acceptance point devices 113 even if the current purchases are identical.

Once one or more loyalty programs are determined for the transaction, the status information is determined for one or more rewards in one or more loyalty programs. Once the status information is determined, a display format in a plurality of display formats 206 is selected for displaying the status information. In one embodiment, the display format selected is transaction specific. For example, variable fields found in portable device information 120 and acceptance point device information 202 may be used to determine a display format 206. Also, other factors may be used to determine the display format. For example, the constraints of a display device, user preferences, etc. may be used.

In one embodiment, a display format is determined so that the status information displayed may stimulate a user to perform a desired action or influence the user's behavior. In one embodiment, a current status is determined along with a reward status and a desired status. The current status is the current position for a user of portable device 110 in one or more loyalty programs. For example, the current status may be a number of items that the user has purchased towards receiving a reward in a loyalty program, the dollar amount of items purchased, etc. The current status may also be the items that need to be purchased in order to receive the reward. Thus, the current status may be forward looking and tells the user what actions need to be performed in order to receive the reward. This enables a merchant to influence user behavior before a purchase is made.

The reward status is a position that the user needs to reach in order to be awarded one or more rewards for the one or more loyalty programs. For example, the reward status may be the items that a user needs to purchase in order to qualify for a reward for the one or more loyalty programs.

The desired status is a position where a merchant would like the user to reach in the loyalty program. For example, it may be desired that a user purchase another product instead of a product that will satisfy the reward status. A different reward for a different loyalty program than the loyalty program associated with the reward status may be offered as the desired status.

Once a display format 206 is determined, the status information is formatted using display format 206 and output in a message 208. Message 208 may be a printed receipt that includes graphics and/or text. Also, message 208 may be an electronic display of the status information that includes graphics and/or text. Additionally, message 208 may be an e-mail, text message, instant message, etc.

Figure 3:
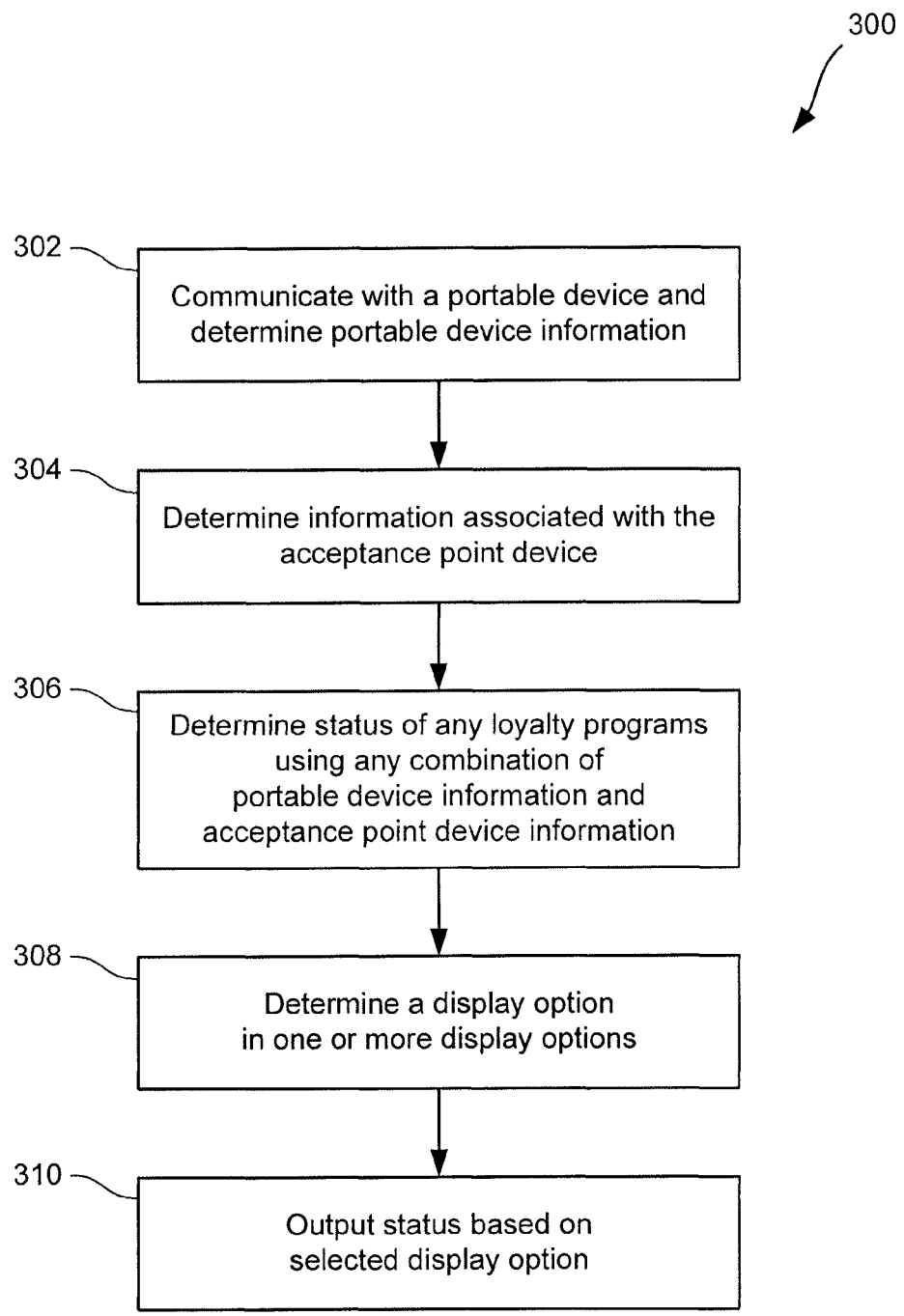
FIG. 3 illustrates a method for providing status information for one or more rewards according to one embodiment of the present invention.

FIG. 3 illustrates a method for providing status information for one or more rewards according to one embodiment of the present invention. In step 302, acceptance point device 113 communicates with portable device 110 to determine portable device information 120. Portable device information 120 includes information unique to portable device 110. For example, portable device information 120 includes status information for one or more loyalty programs in which portable device 110 is eligible.

In step 304, information associated with acceptance point device 113 is determined. Acceptance point device information 202 includes information that is unique to acceptance point device 113. For example, acceptance point device information 202 may include information about which loyalty programs are supported by acceptance point device 113.

In step 306, the status of any loyalty programs that are eligible for this transaction are determined. In one embodiment, any combination of portable device information 120 and acceptance point device information 202 is used to determine the status information. For example, the programs portable device 110 are eligible for are compared to the loyalty programs supported by acceptance point device 113. Status information for the loyalty programs that portable device 110 is eligible for and supported by acceptance point device 113 is then determined.

In determining the status information, a current status, a reward status, and a desired status may be determined. The current status is the current position of the user relative to the reward status. For example, the current position may be the number of items a user has purchased using portable device 110 needs to purchase.

The reward status is the position in which a reward will be awarded. For example, the reward status may be the number of items that need to be purchased in order for a reward to be awarded for portable device 110.

The desired status is a position where a merchant would like the user to reach in the loyalty program. For example, the desired status may be items that a merchant wants to influence the user of portable device 110 to purchase. The desired status is also not limited to the loyalty programs that portable device 110 is eligible for. For example, supported programs for acceptance point device 113 that were not included in portable device information 120 may be included in the desired status. Thus, a user may be offered rewards in different loyalty programs that a user does not participate in or does not know about. Although all three status positions are determined, it will be understood that not all status positions may be determined.

In step 308, once the status information is determined, a display format 206 in one or more display formats 206 is determined. In one embodiment, acceptance point device 113 supports multiple display formats 206. For example, graphical and/or text display formats may be supported. In graphical display formats 206, a graph, table, and other graphical style options may be supported. In addition, text may be included in the graphical display formats.

In one embodiment, display format 206 may be determined using portable device information 120 and acceptance point device information 202. For example, information (e.g., variable fields) in acceptance point device information 202 and portable device information 120 may be used to determine display format 206. The variable fields may be compared with fields associated with a plurality of display formats. A display format 206 that corresponds to the variable fields is then selected.

Additionally, the content of the status information may also be used to determine the display format. For example, different display formats may be selected based on the position of the current status, reward status, and/or desired status. In one embodiment, status information for a new program may be displayed in a different size font or different color than a program that existed or was used by a user before the current transaction.

In step 310, the status information is outputted based on the selected display format. In one embodiment, the status information may be printed or displayed. Also, the status information may be e-mailed, text messaged, instant messaged, etc. If the status information is printed, the status information message may be printed in a combination of text and/or graphics. Additionally, the printing may be produced on the front or back of the receipt and orientation can also be vertical or horizontal. The same is true for status information that is displayed on a display device.

Figure 4:
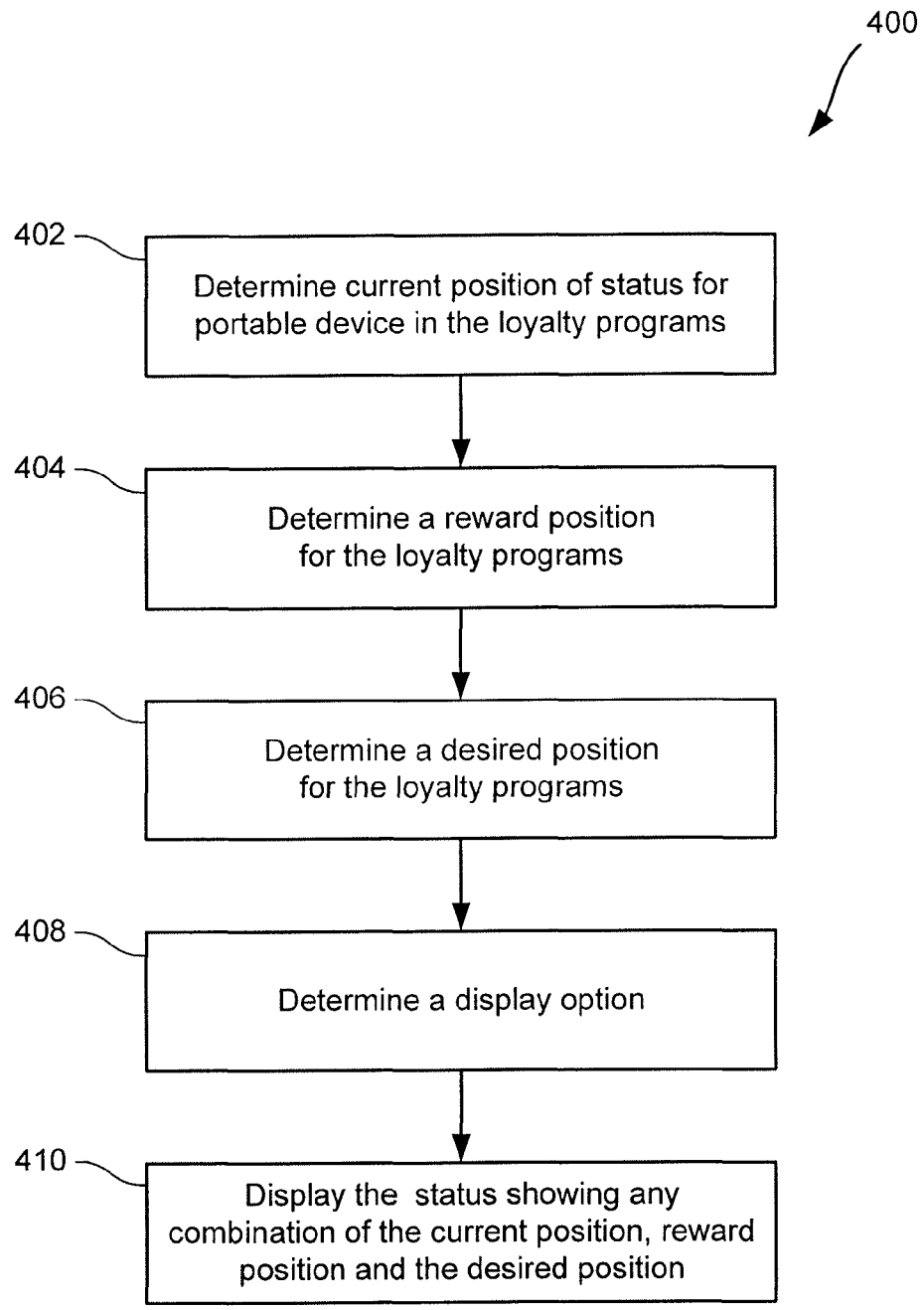
FIG. 4 illustrates a method for determining status information according to one embodiment of the present invention.

FIG. 4 illustrates a method for determining status information according to one embodiment of the present invention. In step 402, a current status for portable device 110 in one or more loyalty programs is determined. In one embodiment, portable device information 120 also includes the current status for the loyalty programs. The current status may include a triggering amount that is needed to obtain a reward.

In step 404, a reward status for the loyalty programs is determined. In one embodiment, information associated with portable device information 120 and acceptance point device information 202 is used to determine the reward position. For example, loyalty program parameters downloaded from host 106 are used to determine how many items are needed for each loyalty program in order for a reward to be awarded.

In step 406, a desired status for any loyalty programs is determined. The desired status may be a level in any loyalty programs that are supported by acceptance point device 113. Thus, a desired status for loyalty programs that portable device 110 does not participate in may be determined. For example, portable device information 120 may not include a loyalty program. However, acceptance point 113 may determine a desired status for loyalty programs that have not been loaded and stored in portable device information 120.

In step 408, a display format 206 is determined. For example, the display format may be determined based on the desired position, current position, and reward position and/or portable device information 120 and acceptance point device information 202. A display format 206 is determined so that a user's behavior will be influenced to perform actions that will satisfy the desired position. For example, a graph may be used that displays the desired position above the reward position in relation to the current position. Also, in order to highlight loyalty programs that are not included in portable device information 120, a section that indicates rewards a user may be interested in may also be displayed. Additionally, the triggering amount may be displayed so that a user can determine what items are needed to obtain the reward.

In step 410, the status information is displayed showing any combination of the current position, reward position, and the desired position.

The following figures depict embodiments of messages 208. Although the following messages 208 are shown, it will be understood that variations of messages 208 may be appreciated.

Figure 5:
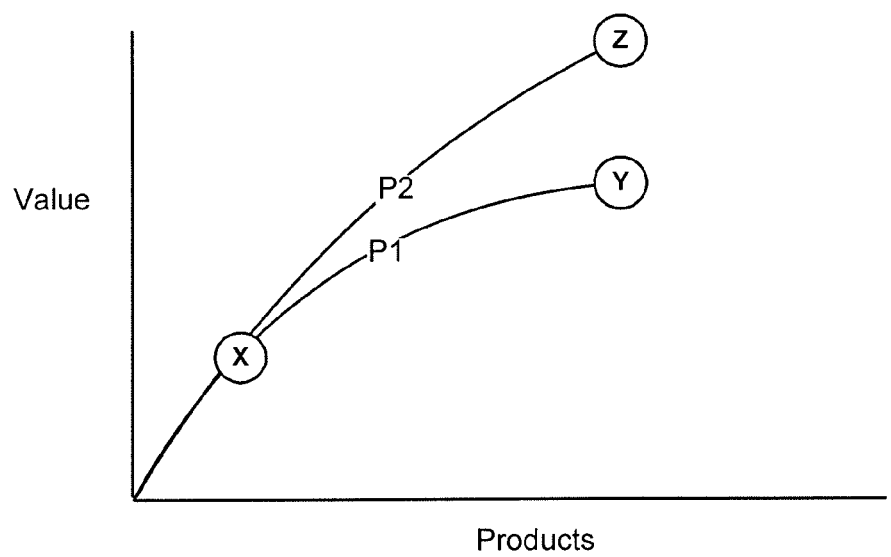

FIG. 5 illustrates a graph 500 that is generated using a display format according to one embodiment of the present invention. Graph 500 includes an X axis and Y axis where the purchase patterns of the loyalty programs P1 and P2 for a user of portable device 110 are plotted. Graph 500 includes two curves, Y and Z, each of which represents a different "next product to purchase from a current status when product X was purchased". A user of portable device 110 may participate in a loyalty program P1 or a loyalty program P2 from the current position X. If the user of portable device 110 purchases product Y, then the reward program P1 is satisfied and the user is awarded a reward equal to a value of $1 on the Y axis. On the other hand, if the user purchases product Z, the reward program P2 is satisfied and the user is awarded a higher value reward, for example, a $2 amount value on the Y axis. As values on the Y axis increase, the reward value increases.

The position "Z" illustrates a desired position for a loyalty program P2. Loyalty program P2 is a loyalty program that a merchant wants to influence a user to participate in. For example, program P1 includes the program "buy one laundry detergent X and two liquid fabric softeners Y and get 5% off." Program P2 includes the parameters "buy one laundry detergent X and three fabric softener sheets Z and get 10% off." If the user of portable device 110 traditionally participates in program P1 and has purchased one laundry detergent X and needs to purchase two liquid fabric softeners to receive a reward, a merchant may offer the user the opportunity to participate in program P2. Program P2, however, requires a user to switch to fabric softener sheets Z and purchase additional quantities to get a higher discount. This information is communicated to a user using graph 500.

Accordingly, the desired status is represented in a graph format along with the reward status. A user can quickly determine which products need to be purchased in order to earn a reward in two different loyalty programs. A large amount of text is not needed to convey the status of loyalty programs to a user.

Figure 6:
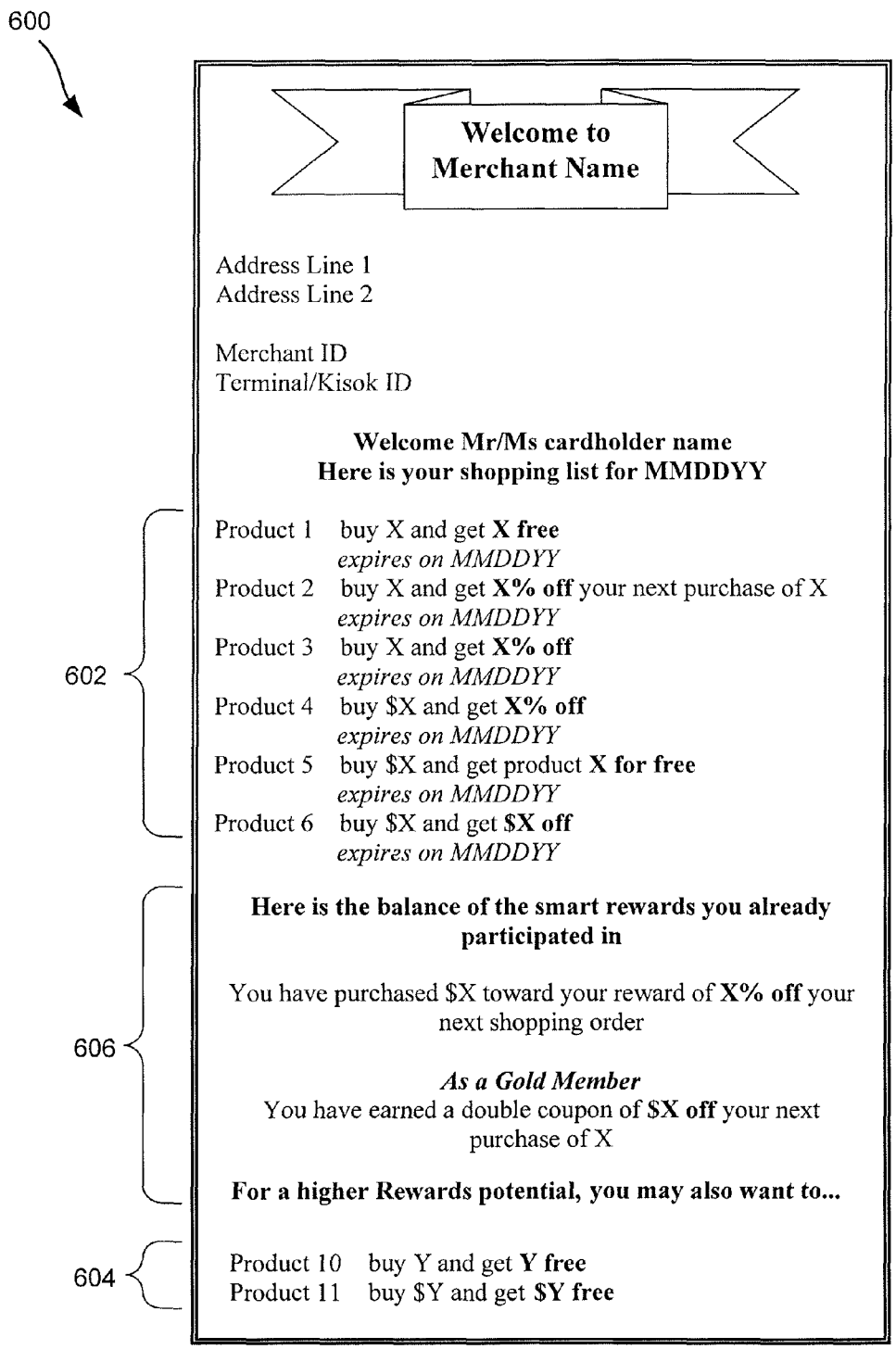

FIG. 6 illustrates a list 600 for presenting status information for one or more loyalty programs using a display format according to one embodiment of the present invention. List 600 includes specific products and quantities for each product purchased for each reward program. A user is informed of what products to purchase and in what quantities in order to maximize rewards.

As shown, a list of products 602 is printed or displayed in list 600. For each product, the quantity that needs to be purchased in order to receive a reward is shown. Thus, the number of products in order to trigger a reward is shown. This allows the merchant to influence a user's behavior before a purchase is made. List of products 602 provides a proactive stimulus in depicting what products need to be purchased in order to receive a reward. This is different from displaying the number of products that have already been purchased by a user. List of products 602 provides a shopping list for a user and is forward-looking rather than backwards-looking.

List 600 also includes a desired list 604 that displays products that offer a higher rewards potential than products listed in list of products 602. For example, in order to influence a user to participate in other rewards programs, list 604 is used to display products that need to be purchased for a higher rewards potential. As shown, product 10 provides the offer of "buy Y and get Y free" and product 11 provides the offer "buy $Y and get $Y off". In one embodiment, products 10 and 11, if purchased, will yield certain rewards that may be more desirable for a merchant.

Other status information 606 may also be displayed in list 600. The information shows the balance or the purchases that have already been made by the user of portable device 110. Additionally, any rewards that have not been earned are also displayed.

Figure 7:
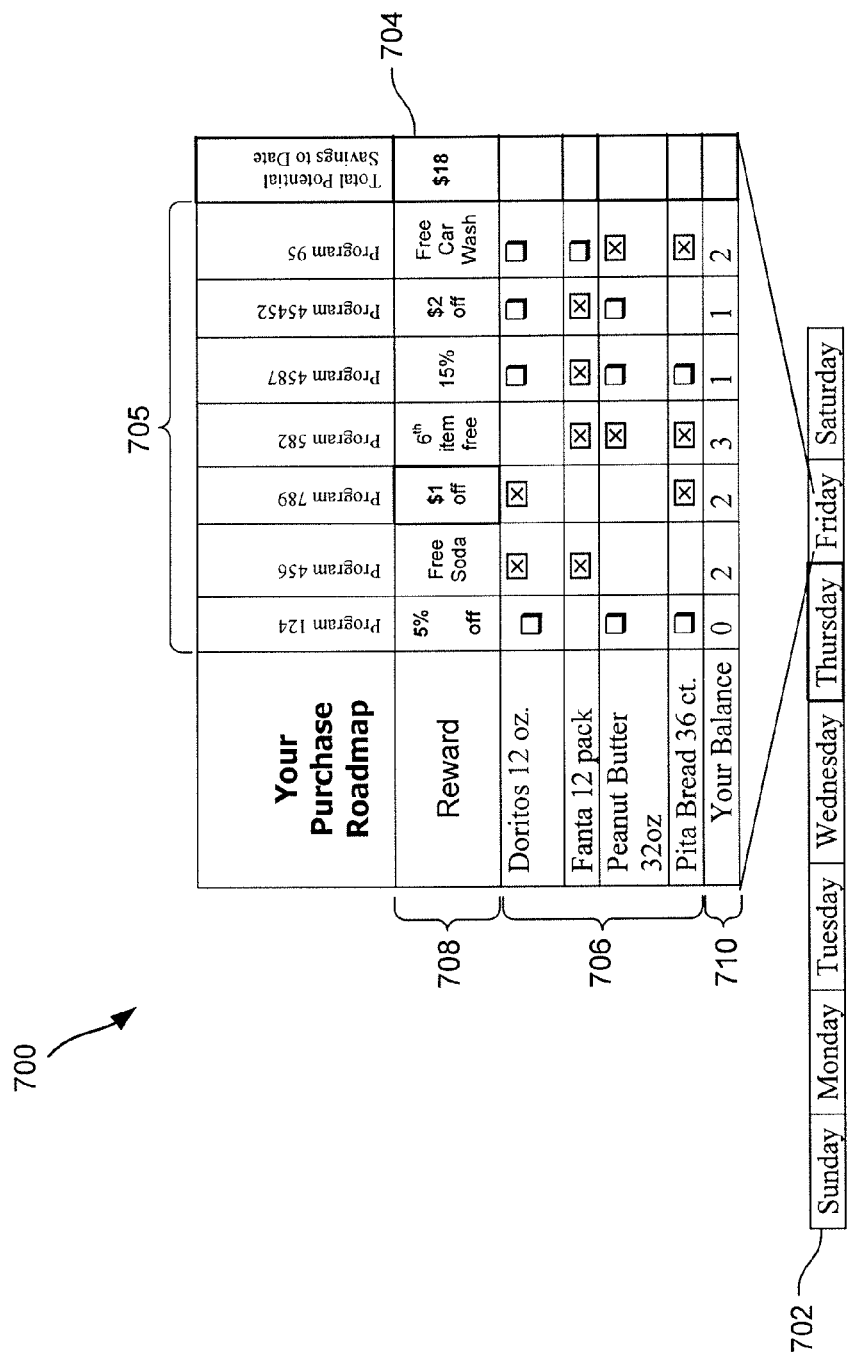

FIG. 7 illustrates a graphical representation of a table 700 for displaying status information using a display format according to one embodiment of the present invention. A list of days 702 is provided that allows status information to be accessed by any day of the week, a week ending, or by month. As shown, the day "Thursday" is selected and a table 704 has been displayed.

Table 704 shows status information for a plurality of loyalty programs shown in columns 705. A purchase road map includes one or more items in rows 706 that need to be purchased in order to qualify for a reward for the loyalty programs. The rewards are shown in a row 708.

For each item and loyalty program, one or more checkboxes are found. The checkboxes are provided to show what products need to be purchased in order to qualify for the reward shown in row 708. For example, for the program 124, Doritos, peanut butter, and pita bread need to be purchased in order to receive a reward of 5% off. Also, for the program 456, Doritos and a Fanta need to be purchased in order to receive a free soda. As shown, the user has not purchased any items for a program 124 (i.e., no checkboxes have been checked) and its balance as shown in row 710 is zero. However, a user has purchased Doritos and a Fanta for program 506 (i.e., the checkboxes have been checked) and has thus received a free soda.

A user may quickly identify which products need to be purchased for which programs by viewing the displayed checkboxes. Table 700 also shows which products need to be purchased in a forward-looking manner rather than just showing what products a user has purchased. For example, for a program 4587, the user can determine that a Fanta twelve-pack has been purchased, but Doritos, peanut butter, and pita bread need to be purchased in order to receive a 15%-off reward. Thus, the table 700 can stimulate purchase behavior by showing what products need to be purchased.

Table 700 also can show a large amount of programs and rewards in a compact manner. In one embodiment, if all the programs and associated products for loyalty programs in table 700 were printed in text, the amount of text would be very large for a printed receipt. Thus, by graphically representing the loyalty programs with the rewards and products that need to be purchased for the reward, status information may be efficiently presented. Also, the status information is displayed in a way that may stimulate user behavior to purchase certain products.

Figure 8:
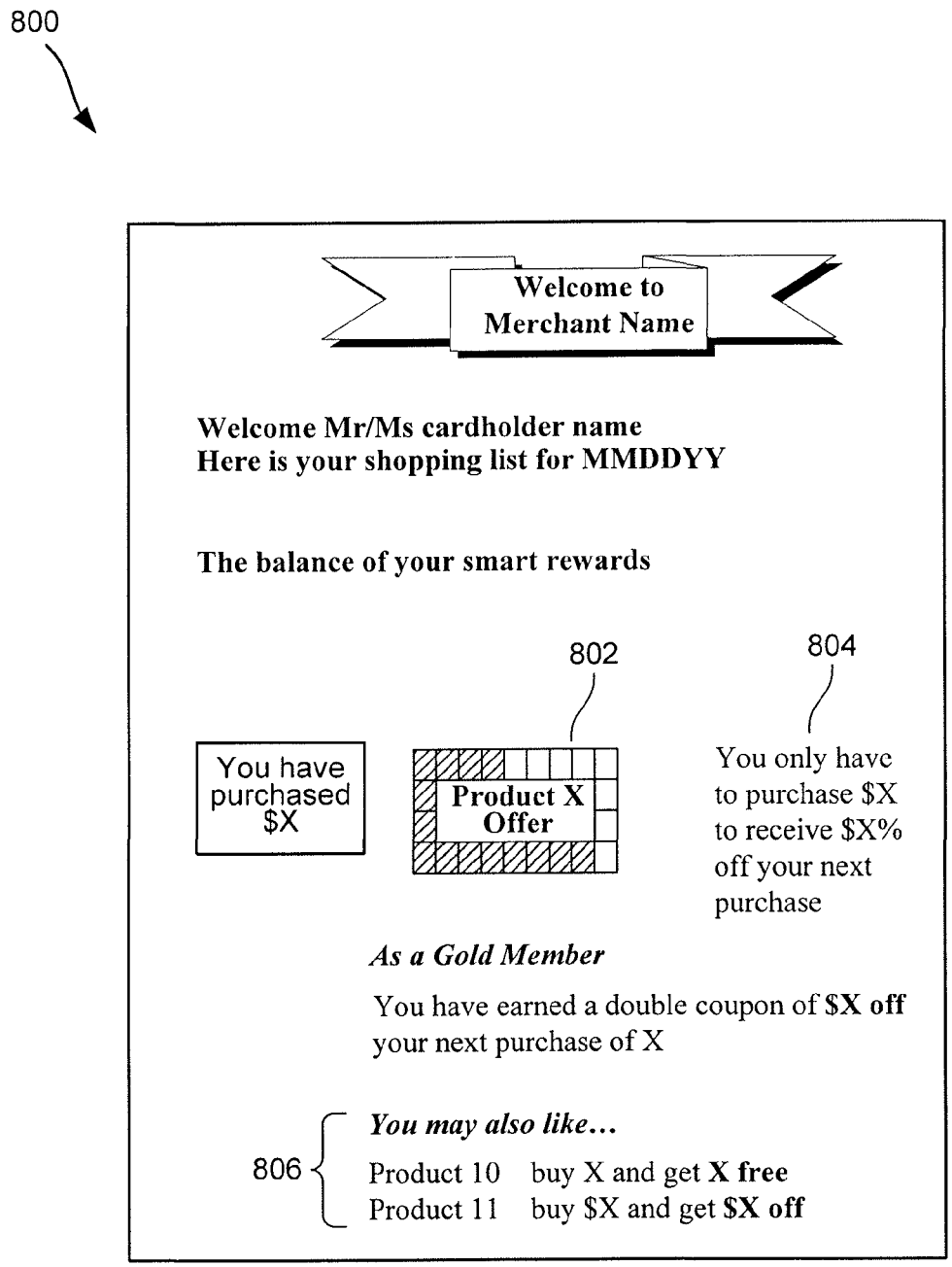

FIG. 8 illustrates a display 800 for status information using a display format 206 according to one embodiment of the present invention. Display 800 includes a graphical display 802 that indicates how many products have been purchased and how many products need to be purchased for a reward of product X in a loyalty program.

Display 802 is designed to give a user an indication of how many units need to be purchased. A number of units that have been purchased is represented with darkened squares and the number of units that need to be purchased are represented with empty squares. Thus, a user can quickly glance at graphical display 802 and determine how many units need to be purchased by looking at the empty squares. The empty squares give a visual sense of how many products a user has to purchase in order to receive the reward. This is different from printing out a number of products that the user has purchased. For example, a user can visually see how far the user is from receiving the reward. Also, the user can see how many units of a product need to be purchased in order to receive the reward.

Also, a text display 804 is shown to indicate the number of products or dollar amount of products that need to be purchased to receive a reward. This presents a forward-looking status of what products need to be purchased instead of indicating what products have already been purchased.

A section 806 is included that indicates programs that a merchant may desire a user to participate in. For example, section 806 includes a product 10 and a product 11 that need to be purchased in order to receive different rewards from loyalty programs that a merchant wants a user participate in.

FIG. 9 illustrates a receipt 900 that displays status information using a display format according to one embodiment of the present invention. As shown, receipt 900 includes a current status 902 of zero dollars. Additionally, receipt 900 includes a reward status 902 that indicates the number of products (dollar amount) that need to be purchased in order to trigger a reward.

Accordingly, embodiments of the present invention provide status information that is displayed according to a display format. In one embodiment, an acceptance point device includes a plurality of display formats. A display format is determined based on information associated with the portable device and information associated with the acceptance point device.

The status information may also include a current status, reward status, and desired status. Thus, a user's behavior may be influenced by displaying a desired status that indicates desired actions that need to be taken in order to receive a different reward than the reward offered for the reward status. Also, the status information may be forward-looking in providing a user with the items that need to be purchased in order to receive a reward.

Embodiments of the present invention include many advantages. For example, a user's behavior may be influenced by providing status information in one of the display formats. A display format that includes graphics may more efficiently display status information for one or more loyalty programs. Thus, a user may be more likely to view the status information and determine which products need to be purchased in order to obtain a reward. Also, by including desired loyalty programs and what products need to be purchased in order to obtain a reward for the desired loyalty programs, a user's behavior may be influenced into participating in more desirable loyalty programs before a purchase is made.

While the present invention has been described using a particular combination of hardware and software implemented in the form of control logic, it should be recognized that other combinations of hardware and software are also within the scope of the present invention. The present invention may be implemented only in hardware, or only in software, or using combinations thereof.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope of equivalents.

What is claimed is:

1. A method of influencing a future purchase of a user, the method comprising:
    during a transaction involving a portable consumer device of a user who participates in a first loyalty program and an acceptance point device of a merchant,
    obtaining, at a computer, portable consumer device information associated with the portable consumer device;
    processing, at the computer, the portable consumer device information to determine a current status of the user in the first loyalty program; and
    determining, at the computer, a reward status for the first loyalty program, the reward status being a position in the first loyalty program that would qualify the user to receive a reward having a first value;
    determining, at the computer, a first future purchase that would cause the user to achieve the reward status in the first loyalty program and qualify the user to receive the reward having the first value;
    determining, at the computer, a desired status for the user, the desired status being a position in a second loyalty program that the merchant desires the user to achieve and that qualifies the user to receive a reward having a second, higher value;
    determining, at the computer, a second future purchase that would cause the user to achieve the desired status in the second loyalty program and qualify the user to receive the reward having the second, higher value; and
    generating, by the computer, a graphical representation that influences the user to make the second future purchase, rather than the first future purchase, by comparatively illustrating that the second future purchase qualifies the user to receive the reward having the second, higher value, whereas the first future purchase would qualify for the reward having the first, lower value.

2. The method of claim 1, wherein an acceptance point device of the merchant obtains the portable consumer device information from the portable consumer device of the user during the transaction involving the user and the merchant.

3. The method of claim 2, wherein the computer obtains from the acceptance point device the portable consumer device information and acceptance point device information.

4. The method of claim 3, further comprising:
    causing, by the computer, the acceptance point device of the merchant to display to the user the generated graphical representation that influences the user to make the second future purchase.

5. The method of claim 4, wherein the acceptance point device information specifies the constraints of a display of the acceptance point device, wherein the constraints of the display are considered when generating the graphical representation that influences the user to make the second future purchase.

6. The method of claim 3, further comprising:
    selecting a display format for the graphical representation that influences the user to make the second future purchase based in part on variable fields in the portable consumer device information and variable fields in the acceptance point device information obtained from the acceptance point device, wherein the selecting comprises comparing the variable fields in the acceptance point device information with a plurality of display formats to select a corresponding display format in the plurality of display formats.

7. The method of claim 6, wherein selecting the display format is based in on the status, the reward status, and the desired status.

8. The method of claim 1, wherein the graphical representation that influences the user to make the second future purchase includes one or more of a chart, a table, a picture, a bar chart, and text.

9. An apparatus configured to influence a future purchase of a user, the apparatus comprising:

storage containing loyalty program information associated with one or more loyalty programs and a plurality of display formats for displaying a graphical representation;

a receiver configured to obtain portable consumer device information associated with a portable consumer device of a user;

logic to process portable consumer device information associated with the portable consumer device of the user to determine a current status of the user in a first loyalty program;

logic to determine a reward status for the first loyalty program, the reward status being a position in the first loyalty program that would qualify the user to receive a reward having a first value;

logic to determine a first future purchase that would cause the user to achieve the reward status in the first loyalty program and qualify the user to receive the reward having the first value;

logic to determine a desired status for the user, the desired status being a position in a second loyalty program that a merchant desires the user to achieve and that qualifies the user to receive a reward having a second, higher value;

logic to determine a second future purchase that would cause the user to achieve the desired status in the second loyalty program and qualify the user to receive the reward having the second, higher value; and logic to generate a graphical representation that influences the user to make the second future purchase, rather than the first future purchase, by comparatively illustrating that the second future purchase qualifies the user to receive the reward having the second, higher value, whereas the first future purchase would qualify for the reward having the first, lower value.

10. The apparatus of claim 9, wherein an acceptance point device of the merchant obtains the portable consumer device information from the portable consumer device of the user during a transaction involving the user and the merchant.

11. The apparatus of claim 10, wherein the receiver apparatus obtains from the acceptance point device the portable consumer device information and acceptance point device information.

12. The apparatus of claim 11, further comprising:
logic to cause the acceptance point device of the merchant to display to the user the generated graphical representation that influences the user to make the second future purchase.

13. The apparatus of claim 12, wherein the acceptance point device information specifies the constraints of a display of the acceptance point device, wherein the constraints of the display are considered when generating the graphical representation that influences the user to make the second future purchase.

14. The apparatus of claim 11, further comprising:
logic to select a display format for the graphical representation that influences the user to make the second future purchase based in part on variable fields in the portable device information and variable fields in the acceptance point device information obtained from the acceptance point device, wherein the logic compares the variable fields in the acceptance point device information with a plurality of display formats to select a corresponding display format in the plurality of display formats.

15. The apparatus of claim 9, wherein the graphical representation that influences the user to make the second future purchase includes one or more of a chart, a table, a picture, a bar chart, and text.

16. The apparatus of claim 9, wherein the apparatus is an acceptance point device of the merchant.

17. A method for displaying status information of a user in one or more loyalty programs, the method comprising:
obtaining, by a computer, portable device information associated with a portable device of the user, wherein the portable device information is provided to an acceptance point device of a merchant during a transaction involving the user and the merchant;

obtaining, by the computer, acceptance point device information associated with an the acceptance point device;

determining, by the computer, a current status of the user in at least one of the loyalty programs based at least in part on the portable device information;

determining, by the computer, a desired status of the user in at least one of the loyalty programs, wherein the desired status represents a status the merchant desires the user to achieve; and selecting, by the computer, a display format from among a plurality of display formats, wherein the selected display format is supported by the acceptance point device, and wherein the selected display format can display on the acceptance point device the current status and the desired status in a manner that will influence the user to perform actions to achieve the desired status.

18. The method of claim 17, further comprising:
wherein the current status is a current position of the user in a first loyalty program and the desired status is a future position in a second loyalty program that the merchant desires the user to achieve, determining, at the computer, a first future purchase that would cause the user to achieve a reward status in the first loyalty program and qualify the user to receive a reward having the first value; and determining, at the computer, a second future purchase that would cause the user to achieve the desired status in the second loyalty program and qualify the user to receive a reward having a second, higher value.

19. The method of claim 18, further comprising:
generating, by the computer, a graphical representation that influences the user to make the second future purchase, rather than the first future purchase, by comparatively illustrating that the second future purchase qualifies the user to receive the reward having the second, higher value, whereas the first future purchase would qualify for the reward having the first, lower value.

20. The method of claim 19, wherein selecting the display format includes:
selecting the display format that is suitable for displaying the generated graphical representation that influences the user to make the second future purchase.

* * * * *